United States Patent
Sinde et al.

(10) Patent No.: US 10,187,112 B2
(45) Date of Patent: Jan. 22, 2019

(54) LEAKAGE DETECTION IN DOCSIS 3.1 ENVIRONMENT

(71) Applicant: VIAVI SOLUTIONS, INC., San Jose, CA (US)

(72) Inventors: Gary W. Sinde, Indianapolis, IN (US); Brett W. Emsley, Zionsville, IN (US); Raleigh B. Stelle, IV, Indianapolis, IN (US); Mathew A. King, Westfield, IN (US)

(73) Assignee: Viavi Solutions, Inc., San Jose, CA (US)

( * ) Notice: Subject to any disclaimer, the term of this patent is extended or adjusted under 35 U.S.C. 154(b) by 0 days.

(21) Appl. No.: 15/548,571

(22) PCT Filed: Feb. 4, 2016

(86) PCT No.: PCT/US2016/016568
§ 371 (c)(1),
(2) Date: Aug. 3, 2017

(87) PCT Pub. No.: WO2016/126943
PCT Pub. Date: Aug. 11, 2016

(65) Prior Publication Data
US 2018/0019786 A1    Jan. 18, 2018

Related U.S. Application Data

(60) Provisional application No. 62/111,838, filed on Feb. 4, 2015.

(51) Int. Cl.
*H04B 3/46* (2015.01)
*H04J 11/00* (2006.01)

(52) U.S. Cl.
CPC ............... *H04B 3/46* (2013.01); *H04J 11/00* (2013.01)

(58) Field of Classification Search
CPC ... H04L 5/0007; H04L 5/023; H04L 27/2675; H04L 2025/03414; H04B 17/27; H04B 3/46
(Continued)

(56) References Cited

U.S. PATENT DOCUMENTS

2003/0206674 A1* 11/2003 Altman ............... H04B 10/505
385/1
2009/0243394 A1* 10/2009 Levine ................... H02J 5/005
307/104
(Continued)

FOREIGN PATENT DOCUMENTS

WO       2014062649       2/2014

OTHER PUBLICATIONS

PCT International Search Report and Written Opinion for PCT/US2016/016568, completed Jun. 10, 2016.

*Primary Examiner* — Emmanuel Bayard
(74) *Attorney, Agent, or Firm* — Barnes & Thornburg LLP

(57) ABSTRACT

Various methods of detecting leakage of a signal from a Data-Over-Cable Service Interface Specification (DOCSIS) 3.1 channel are disclosed, including using a DOCSIS 3.1-defined "exclusion band" to insert existing tagger-based test carriers, using a power signature algorithm to detect the presence of DOCSIS 3.1-defined pilot carriers, and using a time-based correlation technique to detect the presence of DOCSIS 3.1-defined cyclic prefixes.

3 Claims, 7 Drawing Sheets

(58) Field of Classification Search
USPC .............. 375/130, 137, 150, 224, 260, 343
See application file for complete search history.

(56) References Cited

U.S. PATENT DOCUMENTS

| | | | |
|---|---|---|---|
| 2009/0297140 A1* | 12/2009 | Heismann | G01M 11/333 398/16 |
| 2010/0034542 A1* | 2/2010 | Armstrong | H04B 10/5053 398/158 |
| 2011/0043640 A1* | 2/2011 | Zinevich | G01S 5/06 348/192 |
| 2011/0267474 A1 | 11/2011 | Sala et al. | |
| 2012/0076331 A1* | 3/2012 | Giese | H04R 25/356 381/312 |
| 2014/0294052 A1* | 10/2014 | Currivan | H04B 3/46 375/224 |
| 2015/0311923 A1* | 10/2015 | Valliappan | H04W 16/14 370/338 |
| 2015/0358106 A1* | 12/2015 | Limberg | H04L 27/2003 375/308 |

\* cited by examiner

LEAKAGE DETECTION IN DOCSIS 3.1 ENVIRONMENT

CROSS REFERENCE TO RELATED APPLICATIONS

This application is a national stage entry made under 35 U.S.C. § 371(b) of PCT International Application No. PCT/US2016/016568, filed on Feb. 4, 2016, which claims priority under 35 U.S.C. § 119 to provisional application 62/111,838, filed on Feb. 4, 2015, which are both expressly incorporated herein by reference.

BACKGROUND

Pursuant to the recently released Data-Over-Cable Service Interface Specification (DOCSIS) 3.1, the currently-employed 6 MHz spaced channels will be replaced by channels that range in bandwidth from 24 MHz to 192 MHz. The current modulation format (quadrature amplitude modulation, or QAM) will concurrently be replaced by orthogonal frequency division multiplexing, or OFDM. Most leakage detection equipment currently being used relies on the signature of a 6 (or 8) MHz QAM carrier or the insertion of test carriers between adjacent 6 (or 8) MHz QAM carriers. When OFDM carriers are adopted by the cable companies, these leakage strategies will need to adapt to operate in the DOCSIS 3.1 environment. The Data-Over-Cable Service Interface Specification DOCSIS 3.1, which issued on Oct. 29, 2013, is expressly incorporated herein by reference.

DOCSIS 3.1 introduces the concept of a subcarrier, which is a small slice of the complete channel. The channel can be from 24 MHz to 192 MHz in bandwidth and is allowed to operate in either 4K mode (4096 sub carriers) or 8K mode (8192 sub carriers). In 4K mode, the subcarriers are spaced 50 kHz apart, while in 8K mode the sub carriers are spaced 25 kHz apart. Referring now to FIG. 1, four subcarriers 10, 12, 14, 16 of a DOCSIS 3.1 channel 18 are illustrated. Each of the sub-carriers overlaps with an adjacent sub-carrier. For example, sub-carrier 10 overlaps with sub-carrier 12, while subcarrier 12 overlaps with sub-carrier 14, and so forth. The overlap between the subcarriers creates difficulties in identifying and isolating subcarriers on a spectrum analyzer.

Each DOCSIS 3.1 channel also has a continuous pilot carrier, which occurs at the same subcarrier location in every symbol and are needed for receiver synchronization. The pilot carriers are boosted by 6 dB over all other subcarriers in the OFDM signal or channel. This boosting enables easier location and detection of the continuous pilots.

Each DOCSIS 3.1 channel further includes what is called a cyclic prefix, which is a repeated slice or snapshot of a portion of the DOCSIS 3.1 signal. Each snapshot is taken at the end of a symbol and prepended to the beginning of the symbol. For example, if the cyclic prefix is 5 µ-seconds, then the last 5 µ-seconds of an OFDM symbol is copied and prepended to the beginning of that same OFDM symbol. The resulting symbol is now 5 µ-seconds longer. This process is repeated for every symbol, so that each symbol is prepended by a copy of the last part of that symbol. In the DOCSIS 3.1 environment, the cyclic prefix enables a receiver to overcome the effects of intersymbol-interference and intercarrier interference caused by microreflections in the channel. There are five possible values for the length of the cyclic prefix, and the choice depends on the delay spread of the channel—a longer delay spread requires a longer cyclic prefix.

SUMMARY

According to an aspect of the invention, a method for detecting leakage of a signal from a Data-Over-Cable Service Interface Specification (DOCSIS) 3.1 channel comprises removing some orthogonal frequency division multiplex (OFDM) subcarriers to create an exclusion band, and inserting one or more test carriers in the exclusion band at appropriate power levels relative to the remaining subcarriers.

Illustratively according to this aspect, the inserted test carriers are placed in locations where there are no off-air signals to reduce the possibility of other signals interfering with detection of egress of the inserted test carriers.

According to another aspect of the invention, a method for detecting leakage of a signal from a Data-Over-Cable Service Interface Specification (DOCSIS) 3.1 channel comprises tuning a receiver to the boosted continuous pilot carriers present in the DOCSIS 3.1 system, and detecting the continuous pilot carriers.

According to another aspect of the invention, a method for detecting leakage of a signal from a Data-Over-Cable Service Interface Specification (DOCSIS) 3.1 channel comprises detecting the presence of the sidebands or power signatures generated by the modulation in the DOCSIS 3.1 system by determining if, within a frequency/spectral view of the signal bandwidth, a predetermined pattern exists. These patterns are predictable based on the subcarrier index of the continuous pilot, the length of the cyclic prefix, and the length of the symbol.

Illustratively according to this aspect, the method further comprises checking for amplitude matching between spectral components.

According to another aspect of the invention, a method for detecting leakage of a signal from a Data-Over-Cable Service Interface Specification (DOCSIS) 3.1 channel comprises receiving the orthogonal frequency division multiplex (OFDM) signal and time-correlating the OFDM signal with either the ideal signal or a portion of the received signal to detect the cyclic prefix.

Illustratively according to this aspect, time correlating the OFDM signal with either the ideal signal or a portion of the received signal to detect the cyclic prefix comprises time correlating the OFDM signal with each of the five possible values for the length of the cyclic prefix to account for the delay spread of the channel.

BRIEF DESCRIPTION OF DRAWINGS

The detailed description particularly refers to the following figures, in which.

DETAILED DESCRIPTION OF THE DRAWINGS

Figure 1:
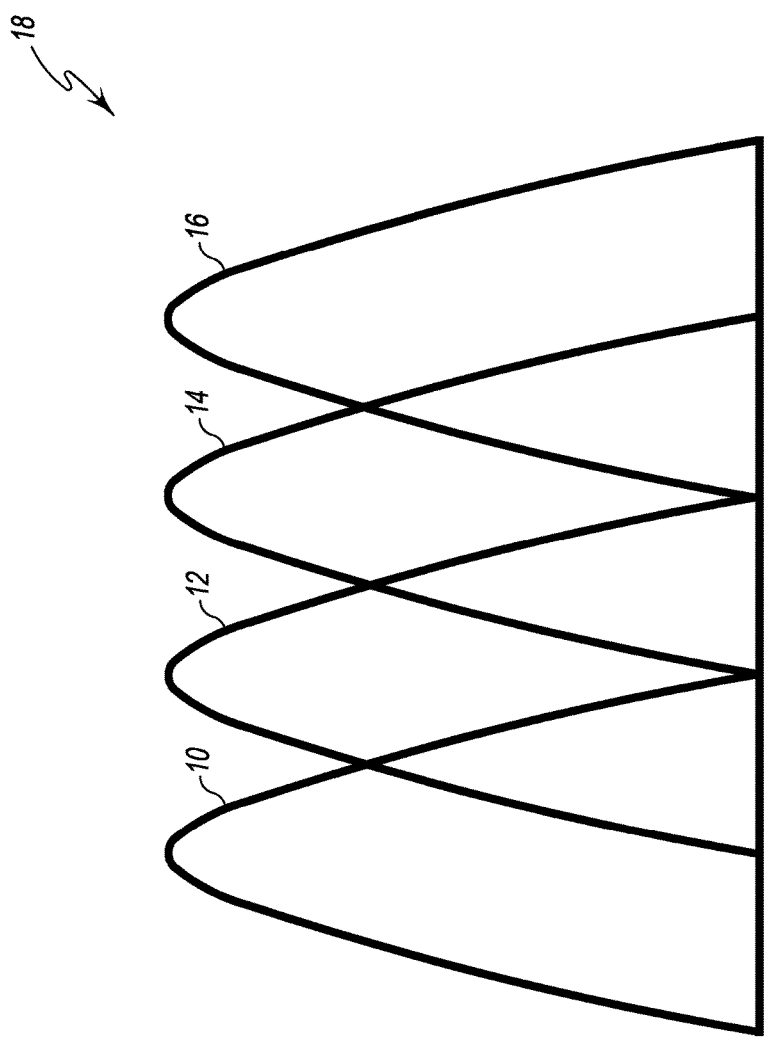
FIG. 1 illustrates a number of sub-carriers of a typical DOCSIS 3.1 orthogonal frequency division multiplexing (OFDM) channel.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

This application describes three methods for detecting signal egress, generally referred to herein and elsewhere as leakage, from a hybrid fiber coaxial (HFC) system. The first method uses current equipment and only requires a configuration change to enable monitoring of the DOCSIS 3.1 signal permitted in the specification. The other two methods involve detecting a particular component of the DOCSIS 3.1 signal, generally referred to hereinafter and elsewhere as "pilot" carriers. These two methods are specific to the detection of the presence of the pilot carrier component, although these methods could be used to detect the presence of only pilot carrier type signals broadcast within the system. Such pilot carriers are currently required to transmit attributes of the signal being broadcast to receivers further out in the system. These signals are currently transmitted using binary phase shift keying, or BPSK, modulation, but these methods could be used to detect other types of modulation as well.

The following three methods are described: (1) use of a DOCSIS 3.1-defined "exclusion band" to insert existing tagger-based test carriers; (2) use of a power signature algorithm to detect the presence of DOCSIS 3.1-defined pilot carriers; and, (3) use of a time-based correlation technique to detect the presence of DOCSIS 3.1-defined cyclic prefixes. It should be appreciated that each method may be used in combination with any of the other methods to provide a single, overall leakage detection technique.

Figure 2:
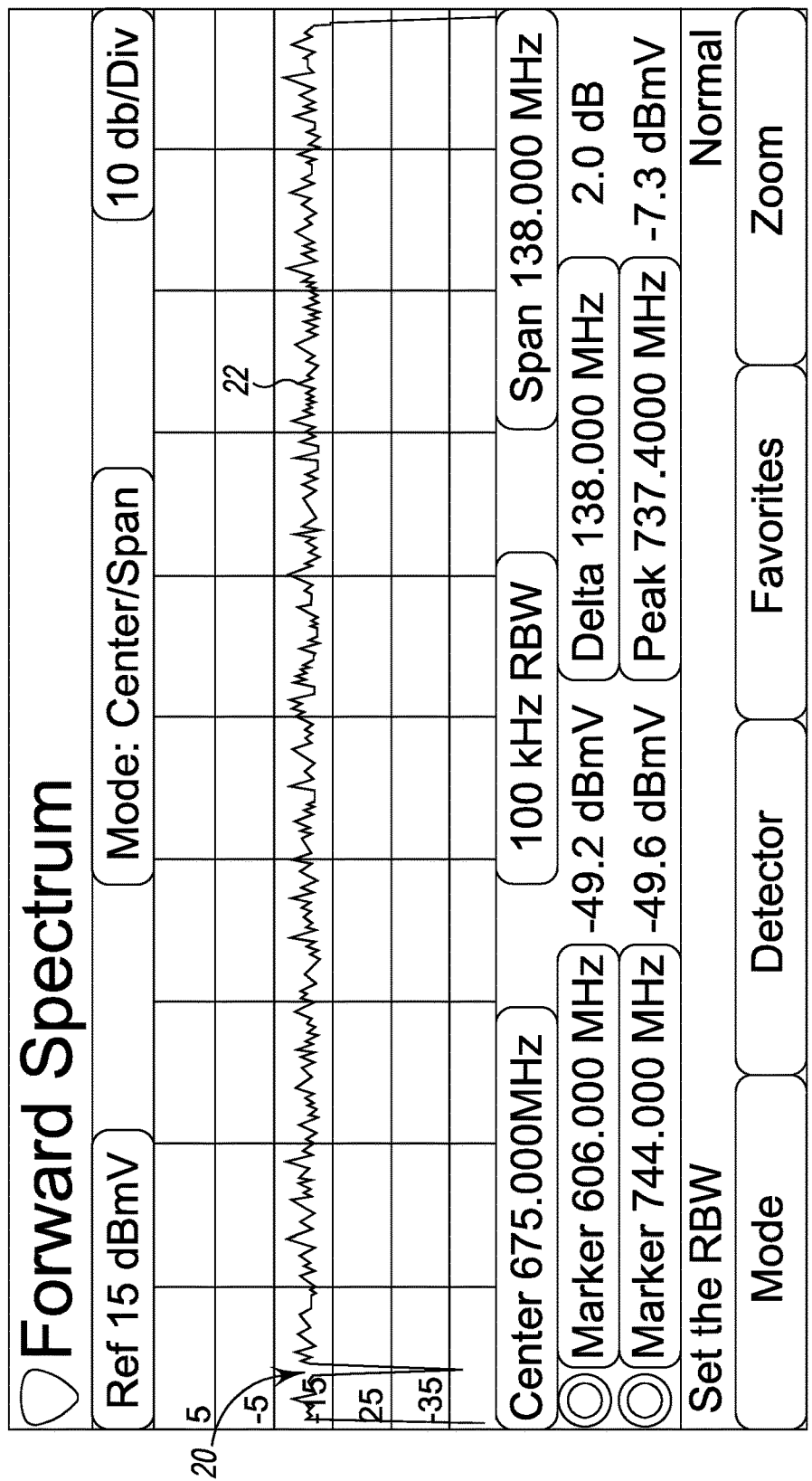
FIG. 2 illustrates a DOCSIS 3.1 OFDM channel.
Figure 3:
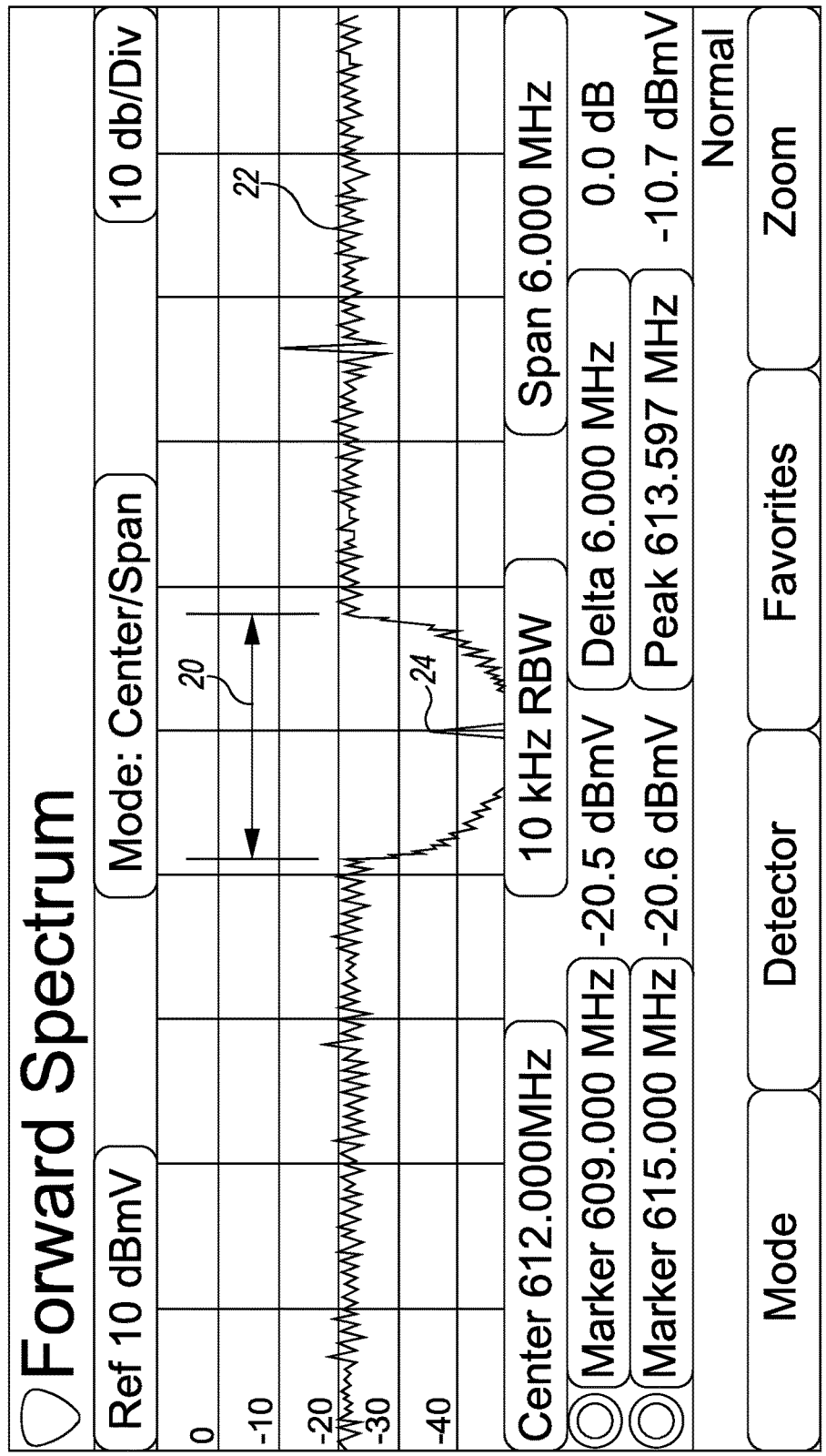
FIG. 3 illustrates an exclusion band in the OFDM channel of FIG. 2.

The first method (1) is the most straightforward to implement because it involves only a special configuration of the DOCSIS 3.1 channel. As illustrated in FIGS. 2-3, an exclusion band 20 may be created by removing some OFDM subcarriers and treating the spaces previously occupied by the removed OFDM subcarriers as "unused" in the channel. In FIG. 2, a DOCSIS 3.1 OFDM channel 22 occupies a space of 138 MHz, and an exclusion band 20 has been created around 612 MHz, as shown in FIG. 3. "Exclusion bands" are defined as notches of spectrum (subcarriers) within the DOCSIS 3.1 OFDM carrier that are unused. A device such as, for example, a Trilithic CT-4 Digital Leakage Tagger can be used to insert one or more test carriers 24 at about the remaining subcarriers' power levels. In FIG. 3, the exclusion band 20 is shown in detail with one or more test carriers 24 inserted. The inserted test carriers 24 are ideally placed in locations where there are no off-air signals. This placement reduces the chance of other signals interfering with the detection by the leakage instrument of egress of the inserted test carriers.

Figure 4:
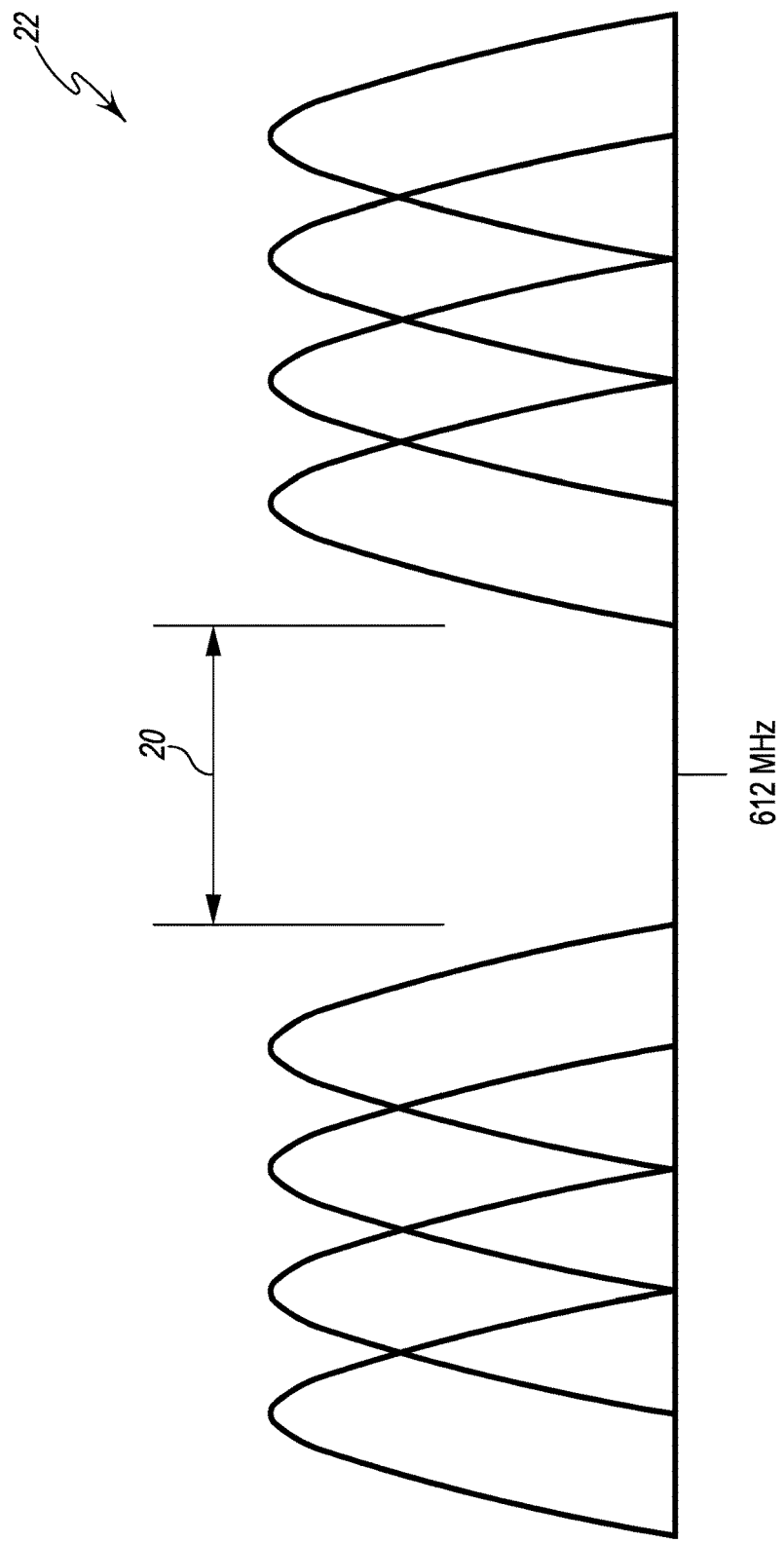
FIG. 4 is another illustration of an exclusion band in the OFDM channel of FIG. 2.

In the illustrative embodiment, a user may insert the CT-4 tagger carrier at 612 MHz at −30 dB from the total power of an adjacent 6 MHz chunk of spectrum. The user may then configure the Cable Modem Termination System (CMTS) at the broadcaster's headend to remove subcarriers from the area around 612 MHz, as shown in FIG. 4, to create an exclusion band without affecting the adjacent subcarriers. In the illustrative embodiment, up to five subcarriers (or 10 in 8K mode) may be removed (250 kHz) without any subcarrier Modulation Error Ratio (MER) degradation such that a 190 MHz maximum bandwidth DOCSIS 3.1 channel in 4K mode with the 5 subcarrier exclusion band causes only a 0.13% of data capacity reduction. In the other embodiments, a 3 subcarrier exclusion band may be created to cause only a 0.08% data capacity reduction. With the test carrier inserted into the exclusion band, the user may use, for example, a Trilithic Seeker D detection system or other detector to locate the test carrier and thereby identify the system from which the leakage originates.

Figure 5:
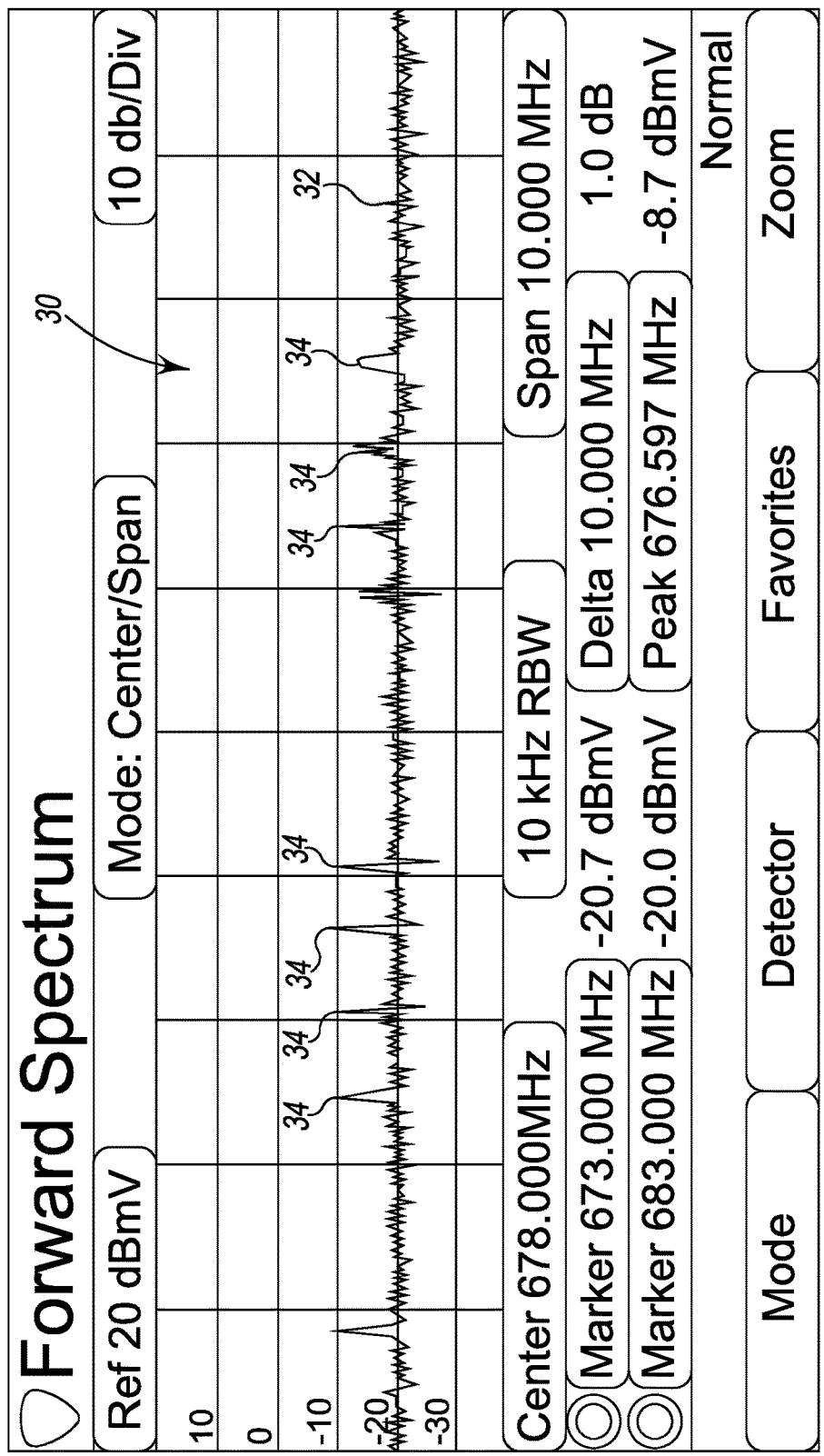
FIG. 5 illustrates a DOCSIS 3.1 OFDM channel with some of the projecting pilot carriers of the channel.

The second method (2) requires no inserted carriers from a tagger-type device. Instead, it examines the continuous pilot carriers present in a DOCSIS 3.1 system to determine the source of the leakage. The DOCSIS 3.1 specification defines "continuous pilots" as pilots that occur at the same subcarrier location in every symbol and are needed for receiver synchronization. The pilot carriers are boosted by 6 dB over all other sub carriers in the OFDM signal or channel. This boosting enables easier location and detection of the continuous pilots. Referring now to FIG. 5, a DOCSIS 3.1 OFDM channel 30 includes a number of subcarriers 32 located around—10 dB.

In one embodiment, the second method detects the presence of the sidebands or power signatures generated by the BPSK modulation by determining if, within a frequency/spectral view of the signal bandwidth, two such sidebands are present at a particular spacing from each other. This method can be further enhanced by checking for amplitude matching between the two sidebands. This method can be further enhanced by determining that a carrier frequency was also present at half the distance between the sidebands. If the amplitude difference is known for this signal, then this method could be further enhanced by ensuring the carrier frequency amplitude difference from either sideband is correct within the received signal. Thus, these additional attributes of the signal become additional means for satisfying the investigator that a signal originates from a particular broadcaster in a situation where signals from multiple broadcasters are present at the same time. If all of these attributes match the attributes of the system being monitored, then it becomes much more likely that detected signal leakage originates from a particular system and can be reported as signal leakage from that system.

Figure 6:
FIG. 6 illustrates a table including settings for determining the location of a pilot carrier of the channel of FIG. 5.

In addition to, or alternatively, the second method detects the unique signatures of the continuous pilot carriers 34 to identify the leakage source. To do so, a user may determine the exact frequency location of one of the continuous pilot carriers 34 based on the Cyclic Prefix Setting, Fast Fourier Transform (FFT) size, and continuous pilot location relative to the subcarrier index (n), which are set by each broadcaster system. For example, as shown in table 40 in FIG. 6, the location of a pilot carrier 34 relative to a particular subcarrier center frequency may be calculated from a 5 μ-second Cyclic Prefix and a 4096 FFT size. It should be appreciate that table 40 represents only one possible setting combination for the DOCSIS 3.1 channel. In other embodiments, other setting combinations may be used to generate hundreds of possible locations for pilot signals. By knowing the configuration of a target broadcaster system, a person of ordinary skill may select the setting combination of Cyclic Prefix, FFt Size, and Pilot Location associated with the target system in order to detect any leakage.

For example, for a Cyclic Prefix Setting of 5 μ-seconds and an FFT size of 8192, there are 8 possible signal locations depending on the Pilot Location (n). For a Cyclic Prefix Setting of 0.9375 μsec and an FFT size of 4096, there are 64 possible signal locations depending on the Pilot Location (n). If a signal is found at one of the predetermined frequencies based on the system being monitored, the user can determine that the detected signal leakage originates from a particular system and report as signal leakage from that system.

The third method (3) involves repeatedly receiving a portion of the OFDM channel and using time correlation to detect the cyclic prefix. In one embodiment, this method detects the presence of particular known and recurring data signal within the subcarriers by means of time-based correlation. Beginning with the assumption that we know a desired/ideal and recurring time-based signal within the data stream being broadcast, we can compare the incoming signal time-based samples to the expected ideal signal. If the sample size is large enough and the ideal signal is substantially different than all other received signals, then correlating/comparing the ideal signal to the received signal will produce higher response for received signals with characteristics similar to the ideal signal than those for, say, random noise or even other non-random signals that are substantially different. If the correlation is long enough in terms of samples, then it is also possible to detect these signals even in the presence of substantial and otherwise disabling levels of noise. This higher correlation response can then be recognized from other responses and used to indicate signal leakage from the system. Given that, the ideal signal will include data potentially unique to a particular system, then the response of the detector will likely indicate signal leakage from that particular system.

This third method takes advantage of the cyclic prefix mechanism to detect the presence of a particular DOCSIS 3.1 signal as the source of signal leakage. If a time-based correlation of the received signal is performed with a time-delayed version of the received signal, then strong correlation peaks will be observed at the new OFDM symbol width. For example, if the original OFDM symbol is 20 μ-seconds long, the addition of a 5 μ-second cyclic prefix will make the new OFDM symbol 25 μ-seconds long. A user may configure a receiver to correlate the currently received signal with a copy of the received signal from the previous 20 μ-seconds, which corresponds to the original OFDM symbol. During the time when the last 5 μ-seconds of the previous 20 μ-seconds is being correlated with the cyclic prefix of that symbol, a strong correlation will be found between the last 5 μ-seconds of the previous 20 μ-seconds and the first 5 μ-seconds of the currently received signal when the two signals are from the same system. In that way, the presence of these large correlations spaced in time by the amount expected from a particular system indicates that signal leakage is likely from that particular system.

Figure 7:
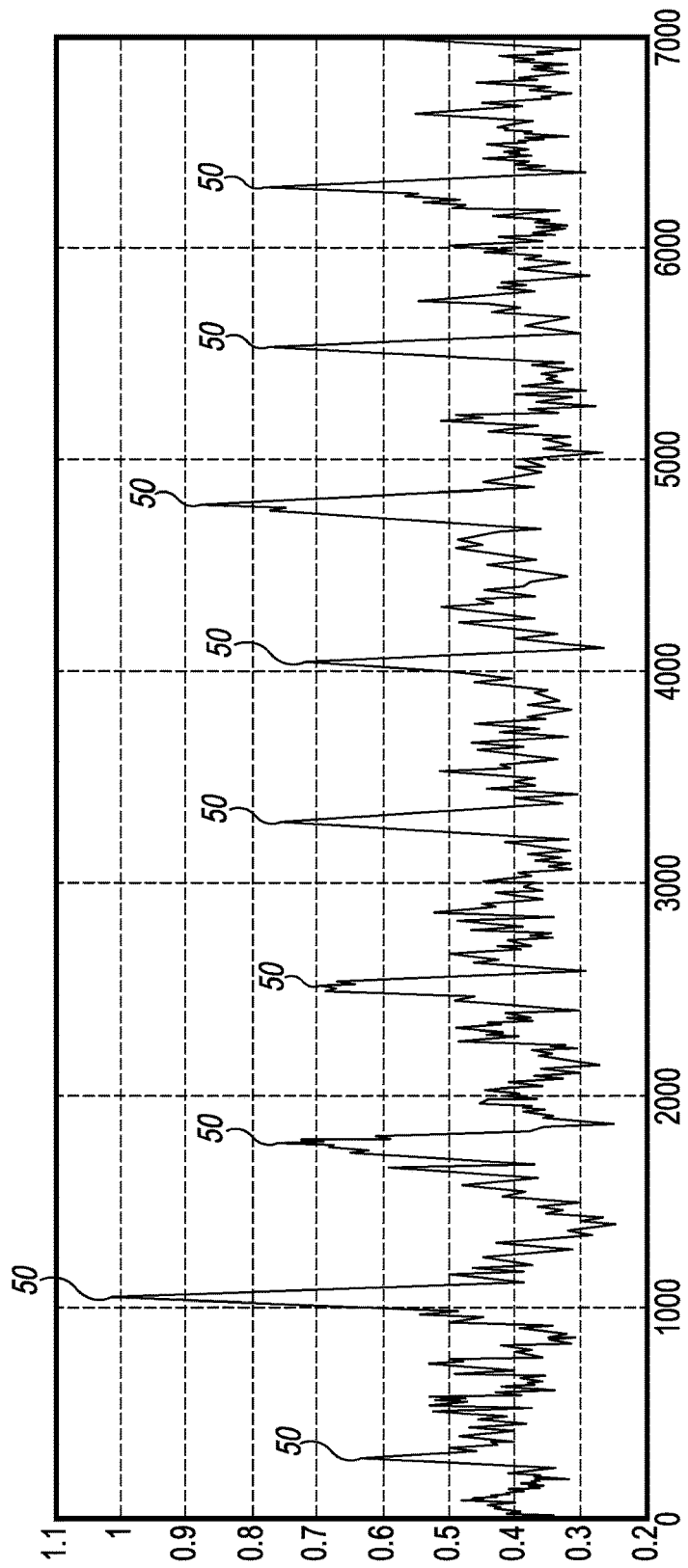
FIG. 7 illustrates the detection of a cyclic prefix of a DOCSIS 3.1 OFDM channel.

FIG. 7 illustrates the detection of a cyclic prefix 50 in a real signal generated by a particular system. As shown in FIG. 7, the cyclic prefix 50 occurs every 750 samples, or 25 μsec. The illustrated in FIG. 7 was generated first by correlating samples of the real signal using equation (1) below:

$$X\text{corr}(n) = x(n) * \text{conj}(x(n-N)) \quad (1)$$

Where N is the FFT size and n is the number of samples. In the illustrative embodiment, the FFT size is equal to 4096.

The Xcorr values from equation (1) are then averaged using equation (2) below and then plotted to generate the graph shown in FIG. 7.

$$\text{Avgl}(n) = \frac{\text{sum}(X\text{corr}(n:n-N\!cp-1))}{N\!cp} \quad (2)$$

Where Ncp is the cyclic prefix length multiplied times the FFT size (N) and n is the number of samples.

While the disclosure has been illustrated and described in detail in the drawings and foregoing description, such illustration and description is to be considered as exemplary and not restrictive in character, it being understood that only illustrative embodiments have been illustrated and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A method for detecting leakage of a signal from a Data-Over-Cable Service Interface Specification (DOCSIS) 3.1 channel of a DOCSIS 3.1 system, the DOCSIS 3.1 system being configured to transmit signals using a modulation technique, the method comprising:
   detecting a pair of sidebands generated by the modulation technique of the DOCSIS 3.1 system by determining if, within a frequency/spectral view of signal bandwidth, a predetermined pattern exists,
   determining whether a carrier frequency is present between the pair of sidebands, and
   determining, based on the detected pair of sidebands and the presence of the carrier frequency between the pair of sidebands, that the signal originates from a particular source.

2. The method of claim 1 further comprising checking for amplitude matching between the pair of sidebands.

3. The method of claim 2, further comprising determining a carrier frequency amplitude difference from each sideband, wherein determining, based on the detected pair of sidebands and the presence of the carrier frequency, that the signal originates from a particular source includes determining that the signal originates from a particular source when the carrier frequency amplitude difference from either sideband is correct.

* * * * *